(12) United States Patent
Karanovic

(10) Patent No.: US 6,295,382 B1
(45) Date of Patent: Sep. 25, 2001

(54) METHOD AND APPARATUS FOR ESTABLISHING AN ADAPTIVE NOISE REDUCTION FILTER

(75) Inventor: Marinko Karanovic, Don Mills (CA)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 09/083,509

(22) Filed: May 22, 1998

(51) Int. Cl.$^7$ .............................. G06K 9/40; G06T 5/20; G06T 5/00; H04N 1/409
(52) U.S. Cl. .................. 382/261; 382/275; 382/205; 382/228; 358/463
(58) Field of Search .................................. 382/261, 264, 382/262, 260, 275, 205, 228, 224; 358/463

(56) References Cited

U.S. PATENT DOCUMENTS 5,768,440 * 6/1998 Campanelli et al. ................. 382/261
5,844,627 * 12/1998 May et al. ............................ 382/261

OTHER PUBLICATIONS

Kuan, D.T. et al, "Adaptive noise smoothing filter for images with signal dependent noise", IEEE Transactions on Patt_n Analyis and Machine Intelligence (Mar. 1985) vol. PAMI–7, No. 2, p. 165–77.*

Eliason, E.M. et al, "Adaptive box filters for removal of random noise from digital images", Photogrammetric Engineering and Remote Sensing (Apr. 1990) vol. 56, No. 4, p. 453–8.*

Rangayyan, R.M. et al, "Filtering multiplicative noise in images using adative region–based statistics", Journal of Electronic Imaging (Jan. 1998) vol. 7, No. 1, p. 222–30.*

Wang, D.C.C. et al, "Digital image enhancement: a survey", Computer Vision, Graphics, and Image Processing (Dec. 1983) vol. 24, No. 3, p. 363–81.*

* cited by examiner

Primary Examiner—Scott Rogers
(74) Attorney, Agent, or Firm—Vedder, Price, Kaufman & Kammholz

(57) ABSTRACT

A method and apparatus for adaptive noise filtering within a video graphics circuit includes determining an average intensity for a kernel of a display area. The kernel includes a plurality of pixels arranged in a particular manner, for example a square, a rectangle, etc. Next, a variance for a pixel within the kernel is determined. Based on a relationship between the average intensity and the variance, a signal-to-noise factor is determined. The signal-to-noise factor includes a noise region, a signal region, and an edge region. The pixel within the kernel is then adaptively filtered based on the signal-to-noise factor, the average intensity, and intensity of the pixel.

17 Claims, 3 Drawing Sheets

METHOD AND APPARATUS FOR ESTABLISHING AN ADAPTIVE NOISE REDUCTION FILTER

TECHNICAL FIELD OF THE INVENTION

The present invention relates generally to video graphics circuitry and more particularly to adaptive noise reduction filtering within video graphics circuitry.

BACKGROUND OF THE INVENTION

Computers are known to include a central processing unit, system memory, video graphics processing circuitry, audio processing circuitry, and peripheral ports. The peripheral ports allow the central processing unit to interface with peripheral devices such as other computers, modems, printers, keyboards, mouses, etc. The evolution of computer technology has seen personal computers dramatically improve in performance, memory capacity, video quality and audio quality. The advances in video quality are a direct result of video graphics circuitry evolution. Such video graphics circuitry evolution has made it economical to include advance video graphic features, such as 3-D imagery, etc. on personal computers.

Such video graphic circuitry includes a mix of analog circuitry and digital circuitry. Typically, in designing a video graphics circuit, the analog circuitry is isolated from the digital circuitry, as much as possible, to shield the analog signals, which are susceptible to noise, from the digital circuitry, which generates noise. Typically, however, board layout isolation, is insufficient to provide the signal to noise ratio desired for high performance video graphics circuitry. One technique to improve the signal to noise ratio provides shielding between the analog and digital circuits such that the shielding shields the noise generated by the digital circuitry to a ground reference. Another noise reduction technique is to use a multilayer printed circuit board where the analog circuitry is on a separate plane, or layer, than the digital circuitry. While shielding and multi-layer boards work well to suppress noise, they are quite costly to implement.

A more cost-effective noise reduction technique is to include an adaptive filter, which filters noise based on the equation $Y_{out}=K \times X_c+(1-K)\mu$, where $K=Sigma^2/(Sigma^2_i+Sigma^2_n)$. In this equation, $\mu$ represents the average pixel value (color, texture, alpha blending, etc.) of the pixels covered by the filter, $Sigma^2$ represents the variance within the display screen, $Sigma^2/Sigma^2_i$ represents the local variance, and $Sigma^2_n$ represents the noise floor. Further, $\mu=(1/L \times W)\Sigma_i\Sigma_j X_{ij}$, where W represents the width (with respect to the x-direction) of the filter and L represents the length (with respect to the y-direction) of the filter. For example, a 3×3 filter encompassing 9 pixels where L equals 3 and W equals 3 wherein $X_c$ represents the center pixel of the filter.

When this filter is applied to an input video signal, it attenuates noise based on the adaptive filtering equation. In general, when there is significant noise, the K term approaches 1, thus the filter filters $X_c$ based primarily on the pixel value of $X_c$ (i.e., the $K^*X_c$ term dominates). When there is little noise, the K term approaches 0, thus the filter filters Xc based on the average pixel value of the pixels covered by the filter (i.e., the $(1-K)$ $\mu$ term dominates). When the noise level is in between, both terms contribute to the filtering of the pixel providing additional filtering when it is not needed. As a result, images appear smoother than intended because definition of the edges of the images has been diluted. As such, the desired video quality is less than optimal.

Therefore, a need exists for a method and apparatus that attenuates noise in video graphic circuitry without the cost of shielding or multi-layer boards and without the smoothing effect of the above-described filtering technique.

DETAILED DESCRIPTION OF A PREFERRED EMBODIMENT

Generally, the present invention provides a method and apparatus for adaptive noise filtering within a video graphics circuit. Such a process begins by determining an average intensity for a kernel of a display area. The kernel includes a plurality of pixels arranged in a particular manner, for example a square, a rectangle, etc. Next, a variance for a pixel within the kernel is determined. Based on a relationship between the average intensity and the variance, a signal-to-noise factor is determined. The signal-to-noise factor includes a noise region, a signal region, and an edge region. The pixel within the kernel is then adaptively filtered based on the signal-to-noise factor, the average intensity, and intensity of the pixel. With such a method and apparatus, the smoothing effect that occurs in prior art adaptive filtering techniques has been substantially reduced, thereby improving video quality.

Figure 1:
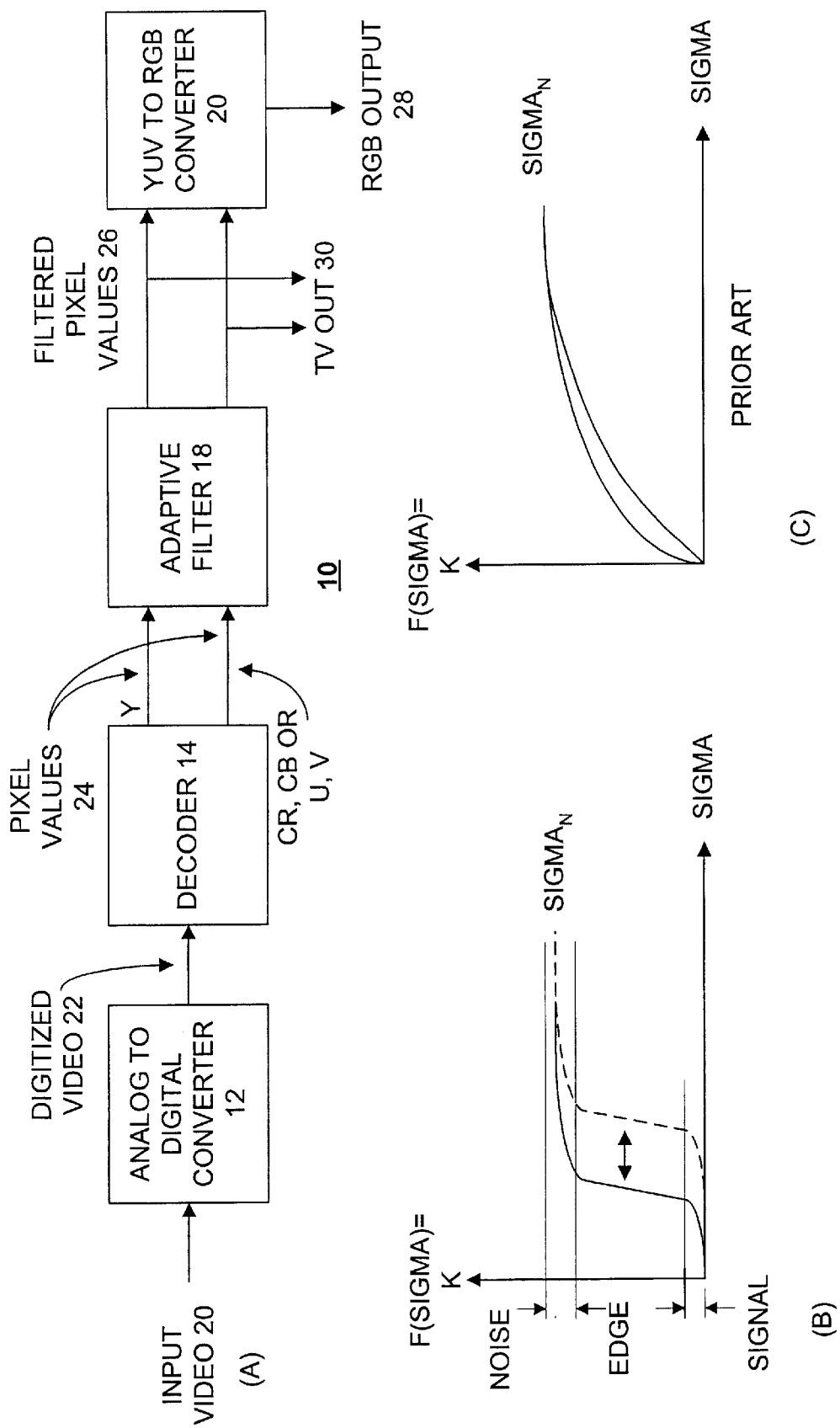
FIG. 1 illustrates a schematic block diagram of a video graphics circuit in accordance with the present invention.

The present invention can be more fully described with reference to FIGS. 1 through 3. FIG. 1 illustrates a schematic block diagram of a video graphics circuit 10 that includes an analog digital converter 12, a decoder 14, an adaptive filter 18, and a YUV to RGB converter 20. The analog to digital converter 12 is operably coupled to receive analog video inputs 20. The analog video inputs may be received from a television tuner that is coupled to receive television broadcasts, satellite broadcasts, and/or cable broadcasts. The input video 20 can also be received from a VCR, DVD player, or any other device that provides input video signals. The analog to digital converter 12 receives the input video signals 20 and converts them to digitized video 22. As one in average skill in the art would appreciate, the analog-to-digital converter 12 may be omitted if the video signals being received have already been digitized.

The decoder 14 receives the digitized video 22 and produces pixel values 24. The pixel values may be YUV data or YCrCb data. The pixel values 24 are provided to the adaptive filter 18, which produces filtered pixel values 26. The filtered pixel values 26 may be provide to the YUV to RGB converter 20 or directly to a TV out port 30. The YUV to RGB converter converts the filtered pixel values 26 into RGB pixel values 28. The ADC 12, the decoder 12, and the YUV to RGB converter 20 operate in a similar manner as to equivalent modules found in ATI Technologies, Inc. All-In-Wonder product, the Rage Pro product, and/or the Rage 128 product.

The adaptive filter 18 performs the filtering function based on the equation $K^*X_c+(1-K)^*M$, where K is determined based on the function shown in the graph in the lower-left portion of FIG. 1. The $X_c$ term is the intensity for the pixel of interest, and M represents the average intensity for the kernel contained within the filtering parameters. The graph shown in the lower-left portion of FIG. 1 plots the Sigma value, which corresponds to the variance versus the K value. The signal-to-noise factor, which is obtained via this graph, includes three sections, a signal section, an edge section, and a noise section. When the pixel being filtered is in the signal range, the K value will be small such that the filtering will be done primarily based on the average intensity M. Alternatively, if the K value is high, indicating that there is substantial noise of this pixel, the filtering will be done based primarily on the particular pixel. When the K value is in the in-between range, indicating that the pixel is along the edge of an object, the filtering will be done in accordance with the above-described equation. By filtering in this manner, the smoothing effect of the prior art technique is substantially reduced because the edge region of the graph is has a very large slope. Thus, little additional filtering is applied.

The graph on the lower-right portion of FIG. 1 represents the prior art representation of the K value. As can be seen, the curve is substantially non-linear approaching an asymptote value of 1. When this curve is applied to an input video signal, attenuation of the signal occurs when it is not needed, i.e., the signal-to-noise ratio (SNR) is very high. As such, the unnecessary filtering causes smoothing, i.e., diluting the definition of edges within a video image. By having three distinct sections of the K value curve, signals having a high SNR will not have unnecessary filtering, while signals with a relatively low SNR, will have the needed filtering.

Figure 2:
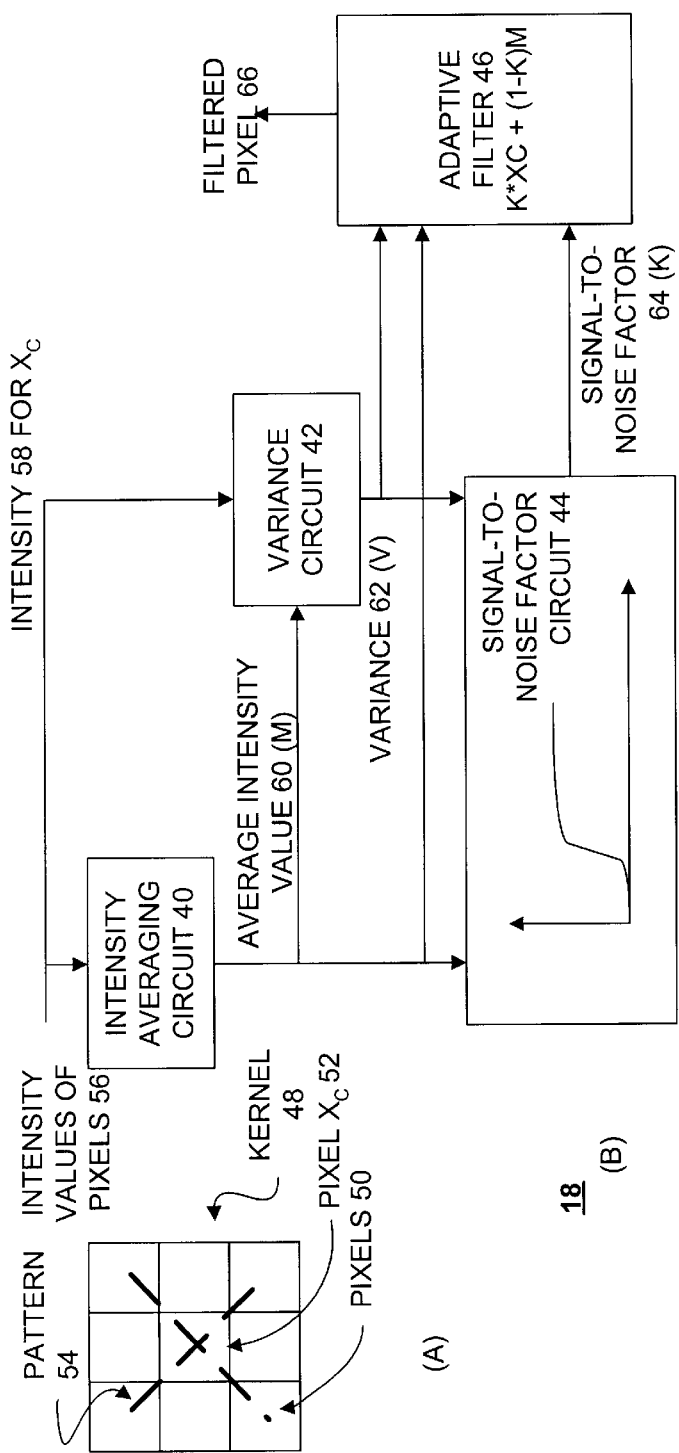
FIG. 2 illustrates a schematic block diagram of the adaptive filter of FIG. 1.
Figure 2:
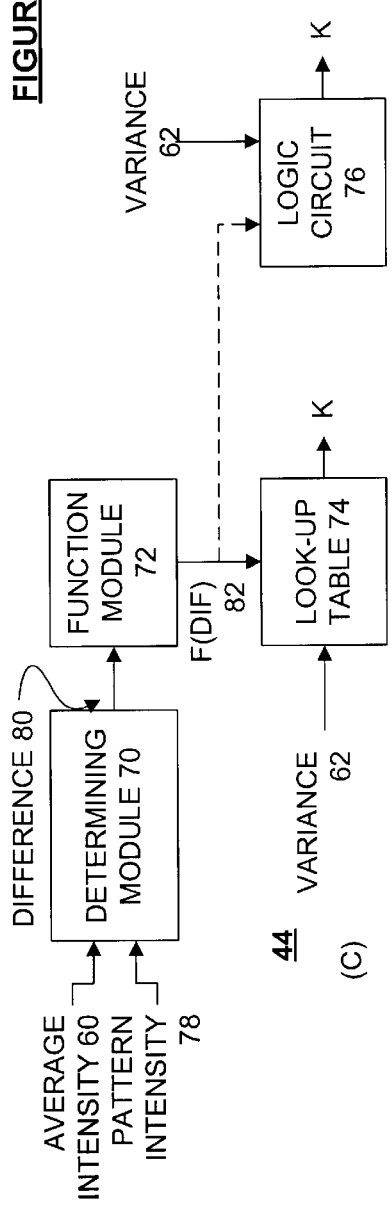

FIG. 2 illustrates a schematic block diagram of the adaptive filter 18, which includes an intensity averaging circuit 40, a variance circuit 42, a signal-to-noise factor circuit 44, and an adaptive filter 46. The intensity averaging circuit 40 is operably coupled to receive intensity values of pixels 56 that are contained within a kernel 48. As shown, the kernel 48 includes a plurality of pixels 50 with the center pixel $X_c$ 52 being located within the center of the kernel. As such, the intensity for each of these pixels, (e.g., the Y value) is provided to the intensity averaging circuit 40. Intensity averaging circuit determines an average intensity value 60 for the kernel 48.

The variance circuit 42 is operably coupled to receive the average intensity value 60 and the intensity 58 for the center pixel 52. Based on these inputs, the variant circuit 42 generates a variance value 62, i.e., the difference between the intensity of the center pixel 52 and the average intensity of the kernel 48.

The signal-to-noise factoring circuit 44 is operably coupled to receive the average intensity value (M) 60 and the variance (V) 62. Based on these inputs, the signal-to-noise factoring circuit 44 generates a signal-to-noise factor 64 (K). The signal-to-noise factoring circuit 44 includes a determining module 70, a functional module 72 and a look-up table 74 or logic circuit 76. The determining module 70 is operably coupled to receive the average intensity 76 and a pattern intensity 78. The pattern intensity is generated by determining the intensities for the pixels corresponding to the pattern 54. By comparing these values, a difference 80 is obtained. If the difference is minimal the variances indicate noise. If the difference is not minimal, the variances indicate an edge. To insure that an edge is present, as opposed to a noise spike, the variance of the center pixel is compared to the average variance of the kernel. If the center pixel variance is above a certain threshold relating to the average variance, the center pixel contains a noise spike, otherwise its an edge. The function module 72 receives the difference 80 and performs a function thereon to obtain the function difference f(dif) value 82. In essence, the determining module and the function module perform the following equations:

1. kernel variance $\sigma = \Sigma_i |X_i - M|$, where i includes the set $\{0 \ldots n\}$;
2. pattern variance $\sigma_{xy} = \Sigma_i |X_i - M|$, where i includes the set of $\{0, 2, 4, 6, 8\}$;
3. $f(dif) = |\sigma - \sigma_{xy}|$; and
4. $K = \sigma * f(dif)$.

Note that the lookup table 74 and/or the logic circuit 76 may perform equation 4.

Alternatively, the signal-to-noise factoring circuit 44 may determine the K value based on the equation $C_0*V-C_2*((C_0*V)^2+(C_1*M)^2)/(C_0*C_1*V*N)$. In this equation, V equals the variance, M equals the average intensity and $C_0$, $C_1$ and $C_2$ are constants derived based on a relationship between the variance and the average intensity. Such a relationship is determined based on the equation $V+V/M-M/V$. This relationship equation determines whether the particular pixel is along an edge, has a high SNR, or a low SNR. The V/M term indicates when the pixel 52 is in a dark region and the M/V term determines when the pixel 52 is in a light region. Thus, by utilizing this equation in conjunction with the previous equation, a determination may be made as to whether a pixel is along an edge or is inclusive of noise. If it is along the edge, the $(1-K)*M$ term should be dominate the filtering, and if the pixel has a low SNR, the $K*X_c$ term should dominate the filtering.

Regardless of how the signal-to-noise factor 64 is generated, the adaptive filter 46, which performs the function of $K\ X_c+1(1-K)*M$, receives the average intensity value 60, the variance 62, and the signal-to-noise factor 64. Based on these inputs, the filter 46 performs the equation to filter pixel 52 producing the filtered pixel 66. Note that if a noise spike is present at the center pixel, the filtering may be done by a fixed low pass filter.

Figure 3:
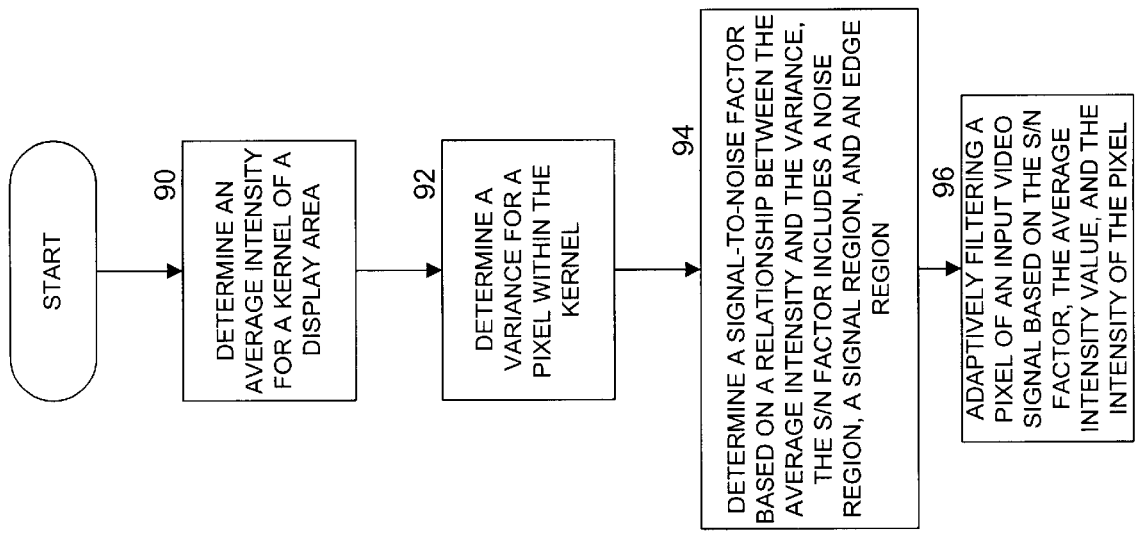
FIG. 3 illustrates a logic diagram of a method for adaptive filtering of video signals in accordance with the present invention.

FIG. 3 illustrates a logic diagram of a method for adaptive filtering in accordance with the present invention. The processing steps of FIG. 3 may be implemented as programming instructions that are stored on a memory device, such as a read-only memory, random access memory, floppy disk, magnetic tape, hard drive memory, and/or any other device that stores digital information. The process begins at step 90 where an average intensity value for a kernel of a display is determined. As previously mentioned, a kernel corresponds to a plurality of pixels of a display area, wherein the display area is displaying frames and/or fields of a video input signal. The video input signal may be received from a VCR, a DVD player, a camcorder, and/or a television tuner.

The process then proceeds to step 92 where a variance for a pixel within the kernel is determined. Typically, the pixel of the interest is the center pixel within the kernel. The process then proceeds to step 94 where a signal-to-noise factor is determined based on a relationship between the average intensity and the variance. Note that the signal-to-noise factor includes a noise region, a signal region, and an edge region as shown in FIG. 1. In particular, the signal-to-noise factor may be determined by determining a difference between the average intensity and a pattern intensity, where the pattern intensity is based on a pattern of pixels within the kernel. Such a pattern may be an X or any other type of pattern desired by the video graphics circuit designer. Next, a function is performed upon the difference to obtain the term f(dif). The variance and the f(dif) term are used to obtain the signal-to-noise factor. Such utilization may be to address a lookup table or as inputs to a logic circuit to retrieve the desired signal-to-noise factor. Note that the curve of the K value, as shown in FIG. 1, may very depending on the noise level. If the noise level is relatively high, the curve may shift to the right, i.e., in the increasing Sigma direction. Such variations would require programming to monitor the noise level to provide an indication as to the orientation of the curve.

Alternatively, the signal-to-noise factor may be determined based on the equation $C_0*V-C_2*((C_0*V)^2+(C_1*M)^2)/(C_0*C_1*V*M)$. In this equation, the V term equals the variance, M equals the average intensity, and $C_0$, $C_1$, and $C_2$ are constants derived based on a relationship between the variance and the average intensity. Such a relationship may be based on the equation of V+VIM−M/V.

The process then proceeds to step 96 where a filter that is delineated by the kernel is adaptively filtered based on the signal-to-noise factor, the average intensity value, and the intensity of the pixel. Note that the filtering may include a diagonally dominate filtering thereby further reducing the perceivable noise parameters in the video.

The preceding discussion has presented a method and apparatus for adaptively filtering video input signals. With such a method and apparatus, adaptive noise filtering within video graphic circuits may be obtained without unwanted smoothing. The unwanted smoothing cause edges of images to lose their definition. The present invention maintains the definition of the edges thereby improving the overall video quality.

What is claimed is:

1. A method for adaptive noise reduction filtering, the method comprises the steps of
   determining an average intensity for a kernel of a display area;
   determining a variance for a pixel within the kernel;
   determining a difference between the average intensity and a pattern intensity, wherein the pattern intensity is based on a pattern of pixels within the kernel;
   performing a function upon the difference to obtain f(dif);
   utilizing the variance with the f(dif) to obtain a signal-to-noise factor, wherein the signal-to-noise factor includes a noise region, a signal region, and an edge region; and
   adaptively filtering the pixel based on the signal-to-noise-factor, the average intensity and intensity of the pixel.

2. The method of claim 1 further comprises obtaining the signal-to-noise factor by utilizing the variance and the f(dif) as inputs to at least one of a look up table and a logic circuit.

3. The method of claim 1, wherein the filtering includes diagonal dominate filtering characteristics.

4. The method of claim 1 further comprises receiving the input video as at least one of: a VCR video signal, a DVD video signal, a camcorder video signal, and a television tuner video signal.

5. A method for adaptive noise reduction filtering, the method comprises the steps of:
   determining an average intensity for a kernel of a display area;
   determining a variance for a pixel within the kernel;
   determining a signal-to-noise factor to equal $C_0*V-C_2*(((C_0*V)^2+(C_1*M)^2)/(C_0*C_1*V*M)$, where V equals the variance, M equals the average intensity, and $C_0$, $C_1$ and $C_2$ are constants derived based on a second relationship between the variance and the average intensity, wherein the signal-to-noise factor includes a noise region, a signal region, and an edge region; and
   adaptively filtering the pixel based on the signal-to-noise-factor, the average intensity and intensity of the pixel.

6. The method of claim 5, wherein the second relationship is based on V+(V/M)−(M/V).

7. The method of claim 5, wherein the filtering includes diagonal dominate filtering characteristics.

8. The method of claim 5 further comprises receiving the input video as at least one of: a VCR video signal, a DVD video signal, a camcorder video signal, and a television tuner video signal.

9. A video graphics circuit comprising:
   an analog to digital converter that is operably coupled to receive an input video and produce a digital representation thereof;
   a decoder operably coupled to receive the digital representation and to produce therefrom pixel values of the input video; and
   an adaptive filter operably coupled to receive the pixel values, wherein the adaptive filter determines an average intensity for a kernel of a display area, determines a variance for a pixel within the kernel, determines a difference between the average intensity and a pattern intensity, wherein the pattern intensity is based on a pattern of pixels within the kernel, performing a function upon the difference to obtain f(dif), utilizing the variance with the f(dif) to obtain a signal-to-noise factor, wherein the signal-to-noise factor includes a noise region, a signal region, and an edge region; and adaptively filters the pixel based on the signal-to-noise-factor, the average intensity and intensity of the pixel.

10. The video graphics circuit of claim 9, wherein the adaptive filter further comprises a look up table that is addressed by the variance and the f(dif) to obtain the signal-to-noise factor.

11. The video graphics circuit of claim 9, wherein the adaptive filter further comprises a logic circuit that receives, as inputs, the variance and the f(dif) to obtain the signal-to-noise factor.

12. A video graphics circuit comprising:
   an analog to digital converter that is operably coupled to receive an input video and produce a digital representation thereof;
   a decoder operably coupled to receive the digital representation and to produce therefrom pixel values of the input video; and
   an adaptive filter operably coupled to receive the pixel values, wherein the adaptive filter determines an average intensity for a kernel of a display area, determines a variance for a pixel within the kernel, determines a signal-to-noise factor equal to $C_0*V-C_2*(((C_0*V)^2+(C_1*M)^2)/(C_0*C_1*V*M)$, where V equals the variance, M equals the average intensity, and $C_0$, $C_1$ and $C_2$ are constants derived based on a second relationship between the variance and the average intensity, wherein the signal-to-noise factor includes a noise region, a signal region, and an edge region; and adaptively filters the pixel based on the signal-to-noise-factor, the average intensity and intensity of the pixel.

13. The video graphics circuit of claim 12, wherein the second relationship is based on V+(V/M)−(M/V).

14. A video graphics circuit comprises:
   an analog to digital converter that is operably coupled to receive an input video and produce a digital representation thereof;
   a decoder operably coupled to receive the digital representation and to produce therefrom pixel values of the input video; and
   an adaptive filter operably coupled to receive the pixel values, wherein the adaptive filter includes:

an intensity averaging circuit operably coupled to receive intensity values for pixels of a given kernel and to produce therefrom an average intensity value;

a variance circuit operably coupled to receive the average intensity value and an intensity value of at least one of the pixels of the given kernel and to produce therefrom a variance;

a signal-to-noise factor circuit operably coupled to receive the average intensity value and the variance that determines a difference between the average intensity and a pattern intensity, wherein the pattern intensity is based on a pattern of pixels within the kernel, that performs a function based upon the difference to obtain f(dif), and that accesses a look-up table based on the variance and the f(dif) to obtain a signal-to-noise factor, wherein the signal-to-noise factor is in one of a signal region, an edge region, or a noise region based on the average intensity value and the variance; and an adaptive filter that filters at least one of the pixels based on the signal-to-noise factor, the average intensity, and the at least one of the pixel values.

15. A video graphics circuit of comprises:

an analog to digital converter that is operably coupled to receive an input video and produce a digital representation thereof;

a decoder operably coupled to receive the digital representation and to produce therefrom pixel values of the input video; and an adaptive filter operably coupled to receive the pixel values, wherein the adaptive filter includes:

an intensity averaging circuit operably coupled to receive intensity values for pixels of a given kernel and to produce therefrom an average intensity value;

a variance circuit operably coupled to receive the average intensity value and an intensity value of at least one of the pixels of the given kernel and to produce therefrom a variance;

a signal-to-noise factor circuit operably coupled to receive the average intensity value and the variance that determines a difference between the average intensity and a pattern intensity, wherein the pattern intensity is based on a pattern of pixels within the kernel, that performs a function based upon the difference to obtain f(dif), and that provides the variance and the f(dif) to a logic circuit to obtain the signal-to-noise factor, wherein the signal-to-noise factor is in one of a signal region, an edge region, or a noise region based on the average intensity value and the variance; and an adaptive filter that filters at least one of the pixels based on the signal-to-noise factor, the average intensity, and the at least one of the pixel values.

16. A video graphics circuit comprises:

an analog to digital converter that is operably coupled to receive an input video and produce a digital representation thereof;

a decoder operably coupled to receive the digital representation and to produce therefrom pixel values of the input video; and an adaptive filter operably coupled to receive the pixel values, wherein the adaptive filter includes:

an intensity averaging circuit operably coupled to receive intensity values for pixels of a given kernel and to produce therefrom an average intensity value;

a variance circuit operably coupled to receive the average intensity value and an intensity value of at least one of the pixels of the given kernel and to produce therefrom a variance;

a signal-to-noise factor circuit operably coupled to receive the average intensity value and the variance, wherein the signal-to-noise factor equals $C_0*V - C_2*(((C_0*V)^2 + (C_1*M)^2)/(C_0*C_1*V*M))$, where V equals the variance, M equals the average intensity, and $C_0$, $C_1$ and $C_2$ are constants derived based on a second relationship between the variance and the average intensity, wherein the signal-to-noise factor is in one of a signal region, an edge region, or a noise region based on the average intensity value and the variance; and an adaptive filter that filters at least one of the pixels based on the signal-to-noise factor, the average intensity, and the at least one of the pixel values.

17. The video graphics circuit of claim 16, wherein the second relationship is based on $V+(V/M)-(M/V)$.

* * * * *